United States Patent
Rusu et al.

[19]

[11] Patent Number: 6,141,323
[45] Date of Patent: *Oct. 31, 2000

[54] CLOSED LOOP CONGESTION CONTROL USING A QUEUE MEASUREMENT SYSTEM

[75] Inventors: Marinica Rusu, Sunnyvale; Ihab A. Jaser, San Jose, both of Calif.

[73] Assignee: Whittaker Corporation, Simi Valley, Calif.

[*] Notice: This patent is subject to a terminal disclaimer.

[21] Appl. No.: 08/660,083

[22] Filed: Jun. 3, 1996

[51] Int. Cl.$^7$ .................................................. H04L 12/56
[52] U.S. Cl. ........................... 370/236; 709/235; 370/412
[58] Field of Search .................................. 370/235, 236, 370/229, 412, 413, 414, 415, 416, 417, 418; 395/200.62, 200.65, 200.53, 877; 709/232–235

[56] References Cited

U.S. PATENT DOCUMENTS

| | | | |
|---|---|---|---|
| 4,769,811 | 9/1988 | Eckberg, Jr. et al. | 370/236 |
| 4,970,720 | 11/1990 | Esaki | 370/416 |
| 5,140,584 | 8/1992 | Suzuki | 370/412 |
| 5,167,033 | 11/1992 | Bryant et al. | 395/575 |
| 5,519,701 | 5/1996 | Colmant et al. | 370/412 |
| 5,572,522 | 11/1996 | Calamvokis et al. | 370/413 |
| 5,737,313 | 4/1998 | Kolarov et al. | 370/234 |
| 5,748,901 | 5/1998 | Afek et al. | 395/200.68 |
| 5,777,985 | 7/1998 | Nakayama | 370/235 |
| 5,864,538 | 1/1999 | Chong et al. | 370/235 |
| 5,898,669 | 4/1999 | Shimony et al. | 370/232 |
| 5,909,443 | 6/1999 | Fichou et al. | 370/412 |
| 5,938,749 | 8/1999 | Rusu et al. | 710/54 |

OTHER PUBLICATIONS

Lee et al., Efficient Flow Control for Multimedia and TCP/IP Traffics, 1996 IEEE, pp. 1327–1332, 1996.
Roberts, Performance of Explicit Rate Flow Control in ATM Networks, 1996 IEEEE Proceedings of COMPCON '96, pp. 22–25, 1996.
Kayali et al., Interoperability among Explicit Rate Congestion Control Algorithms for ABS Service in ATM Networks, 1998 IEEE, pp. 112–121, 1998.

*Primary Examiner*—Huy D. Vu
*Assistant Examiner*—Jasper Kwoh
*Attorney, Agent, or Firm*—Sitrick & Sitrick

[57] ABSTRACT

A queue length measurement device that is comprised of a number of queues that are capable of holding data cells. A differential counter is coupled to each queue. The counter is incremented when a cell is written into the queue and decremented when a cell is read from the queue. An interval measurement device, coupled to the differential counter, generates a pulse to reset the counter at fixed intervals equivalent to n cells time (where n is the maximum number of cells the queue counter can measure). A multiplexer is coupled to the multiple differential counters. A transfer control circuit coupled to the interval measurement device selects the appropriate queue measurement to be output from the multiplexer to the other switch elements. A system and methodology provide for queue flow statistics and closed loop control of cell flow into the queue. A congestion control system is provided comprising a queue (having an input and an output, and capable of storing and outputting a plurality of data cells), an input processor (for coupling a plurality of data cells to the queue input), an output processor, an interval measurement device (generating a pulse at predetermined intervals), and differential queue length generation logic. The output processor, couples to the queue output, for receiving a plurality of data cells from the queue, which generates a queue change in size signal in response to determining for each of the predefined intervals of the difference between a present and a previous queue length.

27 Claims, 4 Drawing Sheets

CLOSED LOOP CONGESTION CONTROL USING A QUEUE MEASUREMENT SYSTEM

BACKGROUND OF THE INVENTION

I. Field of the Invention

The present invention relates generally to queues. More particularly, the present invention relates to measuring the length or available occupancy (status) of queues and a switch system for utilizing the status.

II. Description of the Related Art

As the use of computers increases in businesses, they must be networked in order to make them a productive work tool. Without networks, copying large files from one workstation to another would require copying the files to portable disks that are carried to the next work station to be loaded. This is not feasible for very large files in the megabytes or gigabytes range since that would require a large number of disks and considerable time to copy from one workstation to another.

As computer technology evolves, computers are operating at greater speeds. It's not unusual to find 125 MHz central processing units (CPU) on desktops and in homes. This presents a problem when the computers are networked since the network must be able to transfer data in large volumes and at high rates so that they do not become a data bottleneck, causing the computer to slow down to keep pace with the network.

One such high speed network standard is the Ethernet network. This network couples computers at high data rates to allow efficient data transfer. Switches on the network typically have data cell queues that hold data to be transferred to other computers. These queues store cells temporarily while waiting to be transmitted to another address.

In order to facilitate the operation of the switch, accurate information regarding the queues is needed. Classical methods are using a queue threshold mechanism which is comparing the queue fullness with a pre-assigned queue threshold. Various proprietary schemes are implemented in particular switch designs.

Queues, since they are some form of memory, have a finite length. Therefore, if too many cells are stored in the queue, it can become full. This means the incoming cells either overwrite the stored cells or they are simply discarded until the queue has room. There is a resulting need for a method and apparatus to measure the occupancy status of a queue and communicate this status to the relevant portions of the network switch.

Existing techniques for addressing the problem of the queue becoming full and resulting in loss of data, either within the queue (for overwrite) or of incoming data (by rejection of incoming data). Typically, a back pressure throttle control mechanism provides a high-water mark threshold is chosen within the fixed size queue. When the queue fills beyond the high water mark, a signal is output to the input processing device which is providing the inputs to the queue, to throttle back (either totally stop or decrease the speed by a present amount of) incoming cells to the queue. This method has a number of limitations. First, the decision is made within the queue, based on an absolute threshold level being exceeded. There is no raw information or flow rate or history provided to other processing elements such as input and output elements in a switch, or call admission control processing element, to permit the processing unit to decide how to regulate cell input and/or output to the queue. Furthermore, the high water mark back pressure throttle control provides information of when to decrease or throttle the incoming cells, but does not provide information on how much to decrease or when to increase cell flow.

SUMMARY OF THE INVENTION

It is, therefore, an object of the present invention to provide a queue measurement apparatus that provides more complete and comprehensive information on the available storage capacity and rate of utilization of the queue on an ongoing basis.

It is a further object of the present invention that the queue measurement apparatus provides information to processors external to the queue measurement apparatus and the queue, which information is coupled to an external processing element, ether part of the input processor, the output processor, the separate processing element, or a combination of the above, to permit the external processing element to make decisions on controlling cell flow into and out from the queue.

The present invention encompasses a queue measurement apparatus that measures the changes in size of a queue at fixed intervals of time, and a system which utilizes this measured change to provide flow statistics and closed loop flow control. The apparatus is comprised of at least one queue capable of holding a plurality of data cells. An interval measurement device generates a pulse at predetermined intervals. In one embodiment, this interval is every 32 cells. Differential queue length generation logic, coupled to the queue and the interval measurement device, generates the queue size, preferably in two's complement form, in response to a differential between a present queue length and a previous queue length.

A congestion control system is provided comprising a queue, an input processor, an output processor, an interval measurement device, and differential queue length generation logic. The queue has an input and an output, and is capable of storing and outputting a plurality of data cells. The input processor couples a plurality of data cells to the queue input. The output processor couples to the queue output for receiving a plurality of data cells from the queue. The interval measurement device generates a pulse at predetermined intervals. The differential queue length generation logic is coupled to the queue and the interval measurement device, and generates a queue change in size signal in response to determining for each of the predefined intervals a difference between a present queue length and a previous queue length.

In a preferred embodiment, the differential queue length generation logic has a predetermined maximum count and a predetermined minimum count. The differential queue length generation logic provides the change in size signal in a format providing increased and decreased size information. In a preferred embodiment, the queue change in size signal is generated in two's complement form. The interval measurement device can be fixed or dynamically programmable to time different intervals. In the preferred embodiment, the interval measurement device is a timer that outputs the pulse after timing an interval equal to a predetermined number of data cells. In the preferred embodiment, the differential queue length generation logic is further comprised of a differential counter, incremented for each queue output of a data cell and decremented for each queue input of a data cell, for providing a current change in queue size signal output.

In one embodiment, the system is further comprised of a host computer and a controller. The host computer provides a source for outputting of the data cells, coupled to the input processor, and a destination associated with the source for receiving the data cells coupled from the output processor. The controller selectively modifies the output of the data cells from the queue destined for coupling to the destination, responsive to the respective queue congestion signal wherein the source output of data cells is responsive thereto thereafter throttled responsive to the controller.

In an alternate embodiment of the one embodiment, communication of data cells is in packets comprised of a control cell and a plurality of data cells, and the control means is further comprised of means for selectively modifying the control cell for an output packet of data cells from the queue destined for coupling to the destination, responsive to the queue congestion signal to selectively throttle the source output of data cells responsive to the modified control cell.

A method for controlling data flow in a computer network using a queue measurement device is also provided. The method is comprised of the steps of determining an available capacity of a queue using differential queue length logic, informing other computers in the computer network of the available capacity, and the other computers adjusting their data transfer rate in response to the available capacity.

These and other aspects and attributes of the present invention will be discussed with reference to the following drawings and accompanying specification.

DETAILED DESCRIPTION OF THE ILLUSTRATED EMBODIMENT

Figure 1:
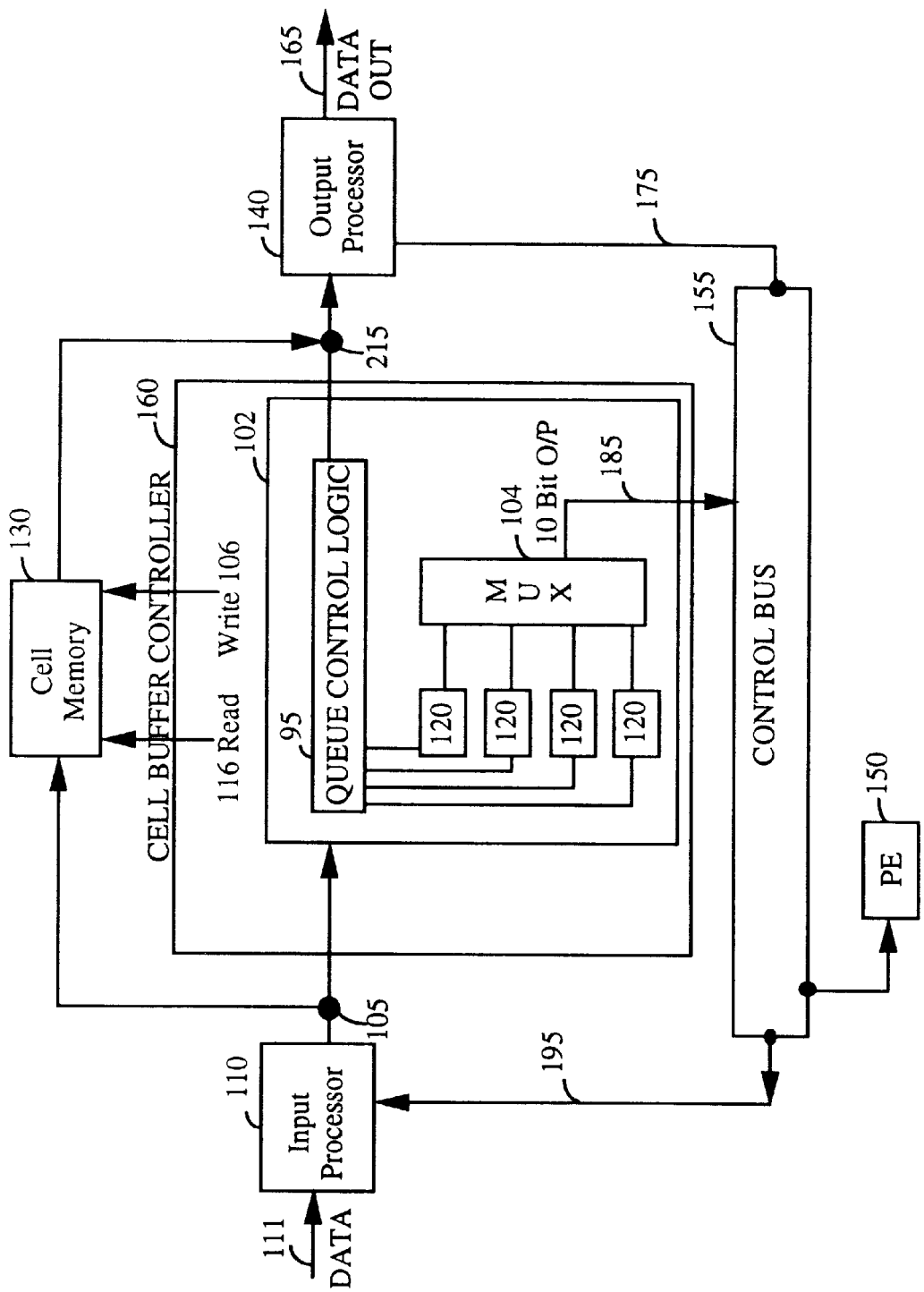
FIG. 1 shows a block diagram of a switch system utilizing the queue measurement system of the present invention.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

In accordance with the present invention, comprehensive information is provided about queue activity, including absolute available capacity of the queue, relative change in cell flow in and out of the queue during each predefined interval, and statistical data on the history of cell flow and queue activity, for each of a plurality of queues. A differential measure counter system is initially reset to zero, so that an external processing element (one or more) has knowledge that the initial queue availability is 100% (i.e. that there are zero cells in or out of the queue initially). Thereafter, during each of a plurality of time intervals, the differential measurement of queue activity is provided as an output, and the external processing element can accumulate information on a statistical basis as well as on an immediate real time feedback basis, to permit control of a greater range of parameters and options external to the queue and queue control logic. For certain applications, such as in a switch where the input processing element, output processing element are realized in the same ASIC (Application Specific Integrated Circuit) and information for call admission control processing element is provided as a set of general registers, the processing element utilizing and maintaining statistical information can be integrated into the cell buffer controller. In this case, an additional output would be provided from the cell buffer controller of more comprehensive and statistical information, providing for read/write and interface capability with external processing elements. However, in the preferred embodiment, the task of processing and accumulating statistical information based on the differential output of the queue control logic and related components is performed external to the cell buffer controller to permit maximum flexibility.

An important element in any switch, ethernet or ATM, is sending a condition control signal. Since the data comes in peaks, most of which are cells, conditions occur where data is coming in at a higher speed than it is going out from the queue. The data is stored in a queue memory. Since the input and output from the queue are independent of one another, and respond separately to a write control signal to input to the queue and a read control signal to output from the queue, it is possible to regulate cell flow through the queue to some extent, by communicating information on the queue's available space and rate of change conditions to the devices which are inputting data into and outputting data from the queue memory. Since conventional back pressure techniques simply provide information that the queue has passed a threshold of being too filled, it merely signals to throttle (slow down or stop) incoming cells into the queue. When the queue has emptied sufficiently so that its level is less than the threshold for back pressure, the back pressure throttling is stopped. However, this permits only very limited control. By providing more information on queue activity, that information can be used by other parts of the system to control the activity of cell traffic flowing into and out of the queue. By measuring the differential of cells coming in and going out of the queue during periodic time intervals, with greater amounts of information, input cell flow and output cell flow can be increased or decreased in order to compensate for the relative change in the queue flow.

Referring to FIG. 1, a switch system is illustrated comprising an input processor (110), output processor (140), and a cell switch fabric comprised of a cell memory (130) and a cell buffer controller (160).

The cell buffer controller (160) partitions the cell memory (130) in a number of virtual queues. In a switch (such as an ATM or Ethernet switch) the information regarding the status of the queues (e.g., level of occupancy or flow rate, etc.) is important information which is used for congestion control as well as for call admission control.

The differential measurement counters (120), one for each of the queue memories within the differential measurement subsystem (102), provide a tracking of the queue cell flow rate and provide an output via multiplexer (104) which is coupled via signal (185) to a control bus (155), which provides for coupling of the multiplexer control signal output to the input processor (110) via signal line (195), and/or to the output processor (140), and/or to a separate processing element (150) which can provide for independent statistical monitoring and data feedback. The differential measurement counter (102) includes differential measurement subsystem queues (130), the differential measurement counters (120), the multiplexer (104), as described in further detail in FIGS. 2 and 3. External data in is provided via data line (111) into the input processor (110) which buffers the input data and is capable, in a preferred embodiment, of regulating the cell flow out coupled via line (105) which provides an output from the input processor coupled to the queue control logic block (95) of the differential measurement subsystem (102) and provides the output from the input processor to the cell memory (130) which contains the queue memory itself. The output from the queue control logic (95) and from the cell memory (130) is provided as output (215) to an output processor (140) which provides a coupling of data out to external apparatus. The output processor buffers, and in a preferred embodiment, is capable regulating the cell flow rate. Additionally, in an alternate preferred embodiment, the output processor is also capable of intercepting control cells and modifying the control cells to provide cell flow information for specific queues to permit intelligent closed-loop flow control feedback to the input processor responsible for the cell flow which is needed to be slowed down. The multiplexer (104) provides an output, which can be of various sizes bit width, depending upon the design constraints of the system, to provide the differential measurement output (as further illustrated in FIG. 3, signal 185). This output, for example, can be a 6-bit value indicating the two's complement value for 32 cells as the maximum count value, providing plus and minus indication, indicating cell flow value and direction (i.e., cell flow in or out), thereby permitting determination of changes in cell flow status from time interval to time interval. Additionally, the output (185) provides an indication of which of the queues the value is for.

The queue length measurement apparatus of the present invention determines the differential rate of change and available length of one or more queues, each capable of holding a plurality of data cells, using a differential measurement technique. In the preferred embodiment, the measurement is provided in a two's complement form to the other elements of the network switch. Once the rest of the switching circuitry knows when the queues are close to filling up, the connected circuitry can slow down its input transfers to the queues or accelerate its output transfers from the queue, or make other decisions.

Figure 2:
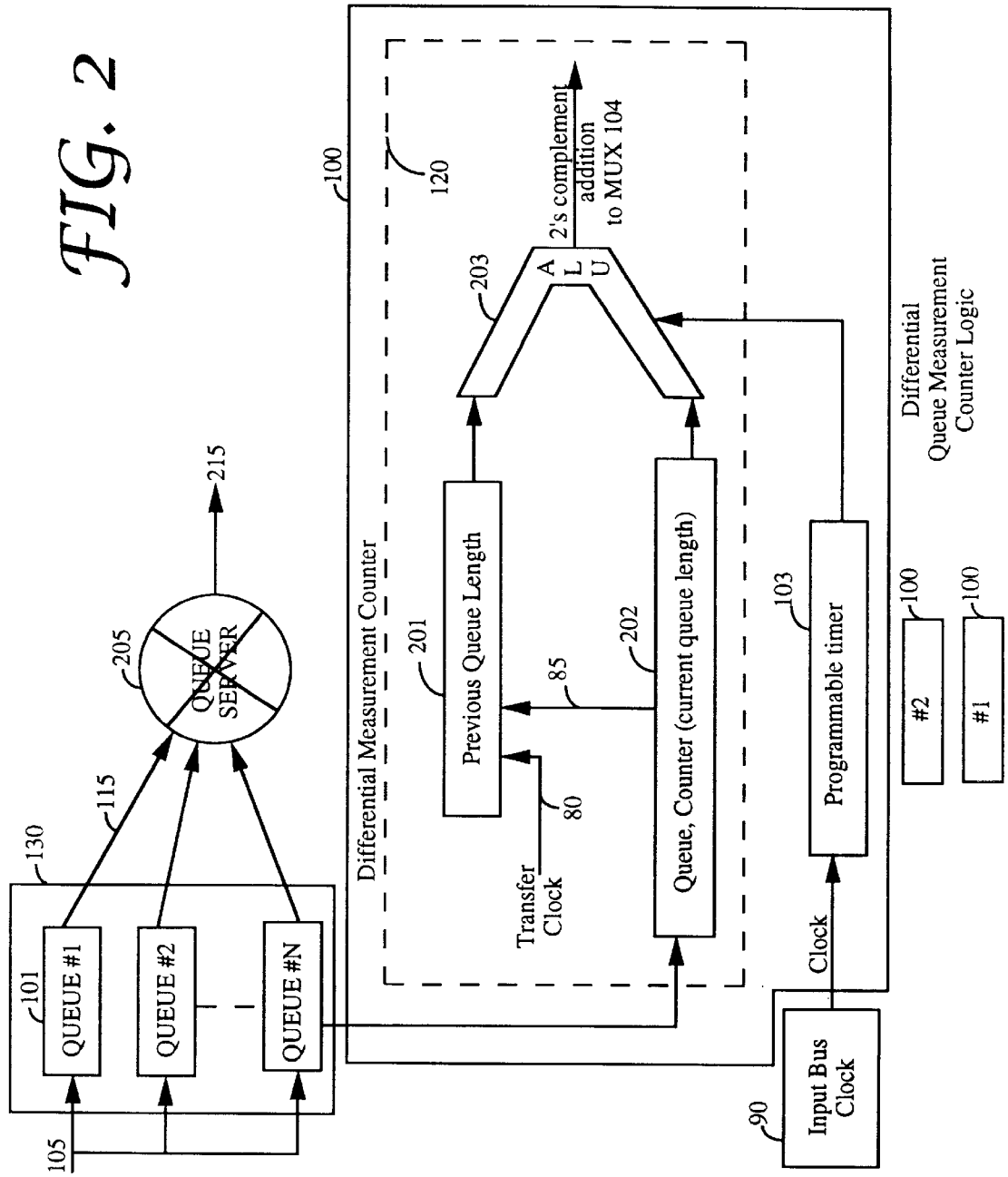
FIG. 2 shows a block diagram explaining the general principles of the differential measurement logic of the present invention.

FIG. 2 illustrates the general principles of the differential measurement mechanism. Differential queue length may be obtained by keeping track of the previous queue length (201) and the current queue length (202). At every time interval generated by the programmable interval timer (103) (responsive to an input bus clock (90)) a two's complement addition is executed by ALU (203) and the result is sent to the rest of the switch elements via multiplexer (104), and then the current queue length replaces the previous queue length via coupling (85), responsive to transfer clock (80) derived from the programmable timer (103) output. The present invention can also work without two's complement output, so long as the differential count value output is a signed value output.

The current queue length counter (202) is incremented every time a cell is written into the queue and decremented every time a cell is read from the queue.

Each queue (101) has an associated respective differential measurement block (100). The data on the line (105) is coupled to the queues (101) of the cell memory (130). The data is extracted from the queues and output as data out lines (115) from each of the queues to a queue server (205) which couples the outputs to an output data bus (215). There are many ways for the queue server (205) to provide output of the individual queue data, including interleaved based on a fixed cycling to a clock, round robin, prioritization based on a priority register as to which queue is to go in which order, etc. The outputs of the queues are input to a queue server (205) that is used to distribute the data stored in the various respective queues to the data output (215).

In order to have an accurate measurement of the queue length, the number range representing the differential in the queue length should be greater than the maximum number of cells that may be added/subtracted from the queue in the programmed time interval, in order to prevent counter overflow/underflow. In a preferred embodiment, the minimum buffer size should be at least two times the equivalent size of the measurement interval.

The present invention uses queue occupancy to determine differential measurement. A generic description of the mechanism is as follows: At fixed (programmable) time intervals, the actual queue length counter (202) is compared with its previous value (201) (previous measuring interval) and a two's complement value is derived. This value represents the differential number of cells which the queue has changed from the last measurement (negative value =the queue decreased with that number of cells, positive value= the queue increased with that number of cells).

Figure 3:
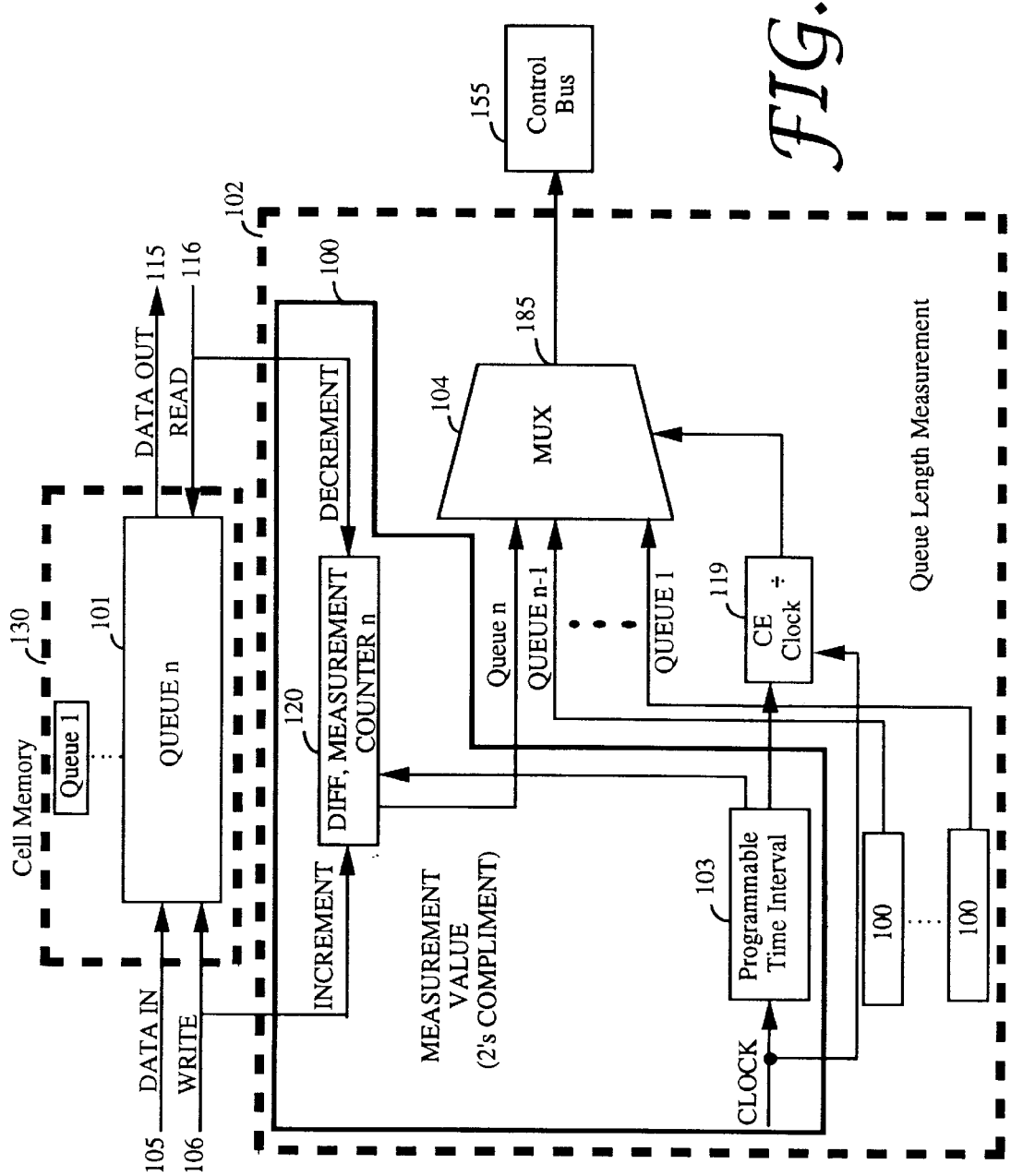
FIG. 3 shows a block diagram of one embodiment of the queue length measurement device of the present invention.

A practical implementation of queue length measurement apparatus is illustrated in FIG. 3. The present invention performs the differential measurement on n (number of queues) (101), each having a plurality of data cells. Each data cell contains one or more bytes of data. In a preferred embodiment, sixteen first-in-first-out (FIFO) buffers are used as queues. Alternate embodiments use other quantities for the number of queues and different types of memory, such as random access memory (RAM). RAM can also be used to implement the FIFO's a shown in FIG. 1.

One queue (101) of the cell memory (130) and the associated blocks (100) of the cell buffer controller (160) of the present invention are illustrated in FIG. 1. This queue (101) accepts data on the line (105) and provides a data output (115) for write and read operations respectively. A write signal (106) informs the queue (101) when data is stable at the input port and ready to be written into the queue. A read signal (116) is used to inform the queue (101) when data is needed from the queue (101) for the output processor. Write and read signals are generated by state machines within the cell buffer controller (160) and are coupled with the arrival of a cell or request for departure of a cell.

The read and write signals are also used by the differential measurement counter (120). This counter is reset on initialization, and read and reset at regular intervals. The write signal is used to increment the counter by one and the read signal is used to decrement the value of the counter by one. Thus, the arrival of a cell (element of information) results in increasing the value of the counter by one and the departure of a cell (element of information) results in decreasing the value of the counter by one. In this way, the differential measurement counter (120) keeps track of a difference between the present queue length and the previous queue length in between its readings. After the counter (120) is read, the value in the counter (120) is reset to zero.

In the preferred embodiment, the counter (120) provides 6 bits of resolution. This is adequate to measure queue changes of up to 32 data cells. Alternate embodiments use other numbers of bits for the counter.

The measurement interval for the queue is implemented by using a timer (103). The timer generates control pulses at fix time intervals (not to be larger than the time that could cause the measurement counter to exceed the maximum value which can be kept therein).

In the preferred embodiment, this timer (103) is clocked by a 33 MHz clock. The timer (103) keeps track of a programmed time interval that is equal to 32 cells. Each cell is 240 ns. long. Therefore, the measurement interval is 7.68 $\mu s$. Alternate embodiments use different measurement intervals, and different clock rates.

After the time interval has elapsed, the timer (103) resets the differential measurement counter (120). This reset operation is performed by the timer (103) outputting a positive going pulse to all of the counters (120) for each of the blocks (100) when the time interval has elapsed.

Each of the queues of the illustrated embodiment of the present invention has its own differential measurement counter to keep track of the difference between the present queue length and the previous queue length (see FIG. 2). For clarity purposes, FIG. 3 shows only one queue with its respective counter (120) in detail. Alternate embodiments use other quantities of queues with respective counters for all of the queues.

The queues may be read (measured) in an interleaved fashion (i.e., one queue at a time). In this case, the time is supplemented by a generator (119) constructed from a counter which generates control signals for the mux (104) regarding which of the queue measurement is output to the output control bus (155).

A multiplexer (104) is connected to the outputs of all the differential measurement counters (120). The multiplexer enables the peripheral switching elements access to each of the queues lengths measurements. In a preferred embodiment, the output (185) of the multiplexer (104) provides an output to the control bus (155) of 6 bit (5 bits for 32 cells, 1 bit for sign (+/−) plus 4 bits (1 of 16 queues) to identify the queue for which the 6 bit measurement value corresponds. Other size control words, measurement value size, and number of queues ID value can be used in alternate embodiments.

The timer (103), shown implemented as a counter, generates the reset pulse for the differential measurement counters (120) as well as the chip enable for the generator (119), which is clocked by the main clock (33 MHz in the preferred embodiment). The control signals from the generator (119) tell the multiplexer (104) which queue measurement value output should be sent out to the control bus (155) to other switch elements. This sequences through the n queues every interval.

In an alternate preferred embodiment, 256 queues are provided, each with its own differential measurement counter, which outputs are coupled to the control bus (155) through multiplexer (104). The multiplexer output (185) can provide queue number identification by transmitting one 14 bit output (8 bits queue number, 6 bits measurement value) or by transmitting two smaller output words (e.g., on an 8 or 10 bit bus, word one=queue number, word two= measurement value, at predefined bit locations within larger word sizes than the data requires). Other combinations are also acceptable. The choice of bus size is a cost/performance decision, and the present invention is compatible with any choice.

By providing a programmable time interval circuit (103), the system can compensate and adapt to cell flow and statistics by shortening the time interval to gain more frequent samples of differential flow rate to permit quicker external adjustment thereto and slow down as appropriate. Additionally, or alternatively, to gain additional resolution or greater accuracy, a counter larger than six bits can be utilized These decisions are a design performance/cost decision.

Additionally, a higher bit accuracy differential counter can be provided which is programmable, so as to normally initialize to a six bit counter, with a 32 cell interval, and provide for adaptive modification of the programmable time interval circuit (103) and differential counter programmable length responsive to current and historical conditions. The external processing unit (e.g. the input processor (110), output processor (140), or processing element (150)) has the intelligence to accumulate the differential count out bits, and make intelligent decisions what to do in regulating cell flow in and out based on the accumulated and current differential output of measurement values of the cell buffer controller (160).

By using a twos compliment, the information is readily usable directly as two's compliment form provides a direct indication of whether the queue has a net differential cell flow in a plus or minus direction, and the absolute cell flow differential for the measured time interval.

Since the measurement value represents the differential of cell flow, the speed of increasing or decreasing cell flow can be used in conjunction with a ratio based on that number to compute a new speed to increase or decrease cell flow or multiple break points or ratios where cell flow is incrementally increased or decreased respectively. How fast or slow, and the break points, and how it is computed as to what new speed should be, is a design decision. Since information is being provided to the next level of intelligence as to differential cell flow, it simplifies the design of the cell buffer controller, yet provides a rich information content to other interacting system elements to permit for better and faster and optimized performance.

Another advantage of the invention over prior techniques and systems, is that the present invention permits a decision to be made as to when to increase the speed of cell flow in or out of the queue. Prior art systems using back pressure to throttle, can easily decide when to decrease incoming cell flow when a threshold is exceeded, but provide very little relevant information other than the threshold is no longer exceeded as to when to increase cell flow into the queue, and by how much.

There are multiple queues, and multiple differential measurement counter systems which couple to the multiplexer (104). Thus, for each of the sources of cell input flow, a rich information content can be accumulated and statistics can be utilized in conjunction with real time measurement value output to permit adaptive control of cell flow so as to optimize performance. Additionally, decisions can be made to switch incoming cell flow from one queue to another, based on usage information as to the totality of queues.

The advantage of the proposed method and apparatus is that the queue increase/decrease information (the measurement value) is obtained at fixed (or programmable or known) time intervals, and is propagated (in the form a two's complement integer) across the switch so that it may be used within the switch by various elements such as in the Input Processing Elements (110) correlated with EPD (early packet discard), PPD (partial packet discharge) techniques for ABR (Assigned Bit Rate) and UBR (Unassigned Bit Rate) type of traffic; in the Output Processing Elements (140) correlated with EFCI (Explicit Forward Congestion Indicator) congestion notification technique and with BECN (Backward Explicit Congestion Notification) and ER (Explicit Rate) techniques for ABR type of traffic; and in a CAC (Congestion Admission Control) Processing Element (150) to be used for call admission/rejection.

In a preferred embodiment, the minimum buffer size should be at least two times the equivalent size of the measured interval.

The queue increase/decrease information generated at fixed or programmable but known time intervals may be used by the above named elements to compute the total queue length in near real time (at defined intervals); or compute statistics to be used with PNNI (Private Network to Network Interface) algorithms, or compute parameters needed for CAC (Connection Admission Control) by using various filtering techniques, such as moving average, exponential average, etc. (See, for example, Openheimer, "Digital Signal Processing").

As discussed above, to measure the changes in the queue length the following elements are used. The queue counter (202) (see FIG. 2) is incremented when a cell is written into the queue and decremented when a cell is read from the queue. This is preferably a saturation type counter (i.e., cannot be decremented beyond 0 and cannot be incremented beyond Max Queue Length). The Max Queue Length is a value which is fixed (programmed) at power up. In some embodiments, the network management software can dynamically change the Max Queue Length. The Previous Queue Length register (201) element holds the value from the previous measurement. The Timer Control (103) is a time generator unit which generates the interval measurement. The interval measurement can be generated from a real time clock like circuit In the particular illustrated embodiment, the interval measurement is derived from the Input Bus clock (33 Mhz). The interval measurement may be fixed or programmable. Generally, a fixed interval will be satisfactory. Two's Complement Arithmatic Logic Unit (ALU) (203) computes the differential change between the current value of the queue and the previous value in the form of a two's complement representation. The measured value may be any length. Alternatively, output can be provided in other than two's complement form.

The measurement value for each queue can be utilized in conjunction with the priority of the data cells flowing into the respective queue to determine how to handle a situation where a queue is becoming congested. Thus, as one example, where a cell flow is part of a packet, and some cells of the packet must be dropped, the rest of the cells should also be dropped. Another example is if it is seen that the queue differential is increasing too fast (there are too many cells going into the queue vs. leaving the queue, during the last interval of queue measurement as well as over accumulated time, and this information is communicated back to the input processor which knows it has more cells in a row coming in than the queue is capable of holding, the input processor can make a decision to drop packets or slow down before the maximum is reached and data is lost.

An alternative technique can be used where a control cell is included within the packet. For example, if every 32nd cell is a control cell, the cell can be modified responsive to the measurement value, to provide queue information, such as that the queue is congested and how badly. It can also identify that the queue is congested because a particular source and another unidentified source are sending data. The control cell which is going back to the source can be modified to change the rate or speed at which the source is sending cells, and other information such as how many sources are trying to use the same queue at the same time. Another factor is the amount or time of delay, where traffic is so heavy that there is some process delay. The rate of change in which the queue measurement is changing is utilized to make the decision as to the change in rate.

With unassigned bit rate service (UBR), there are no control cells. Therefore, the control cells can't be utilized to tell the source to slow down, and cells must be dropped. With assigned bit rate service (ABR) a control cell is provided, which has a direction indication, and can control the speed of sources. This control cell is referred to as a spatial resource management cell. Another type of service is a variable bit rate service (VBR service), which is usually utilized for video, and therefore a delay is important.

Figure 4:
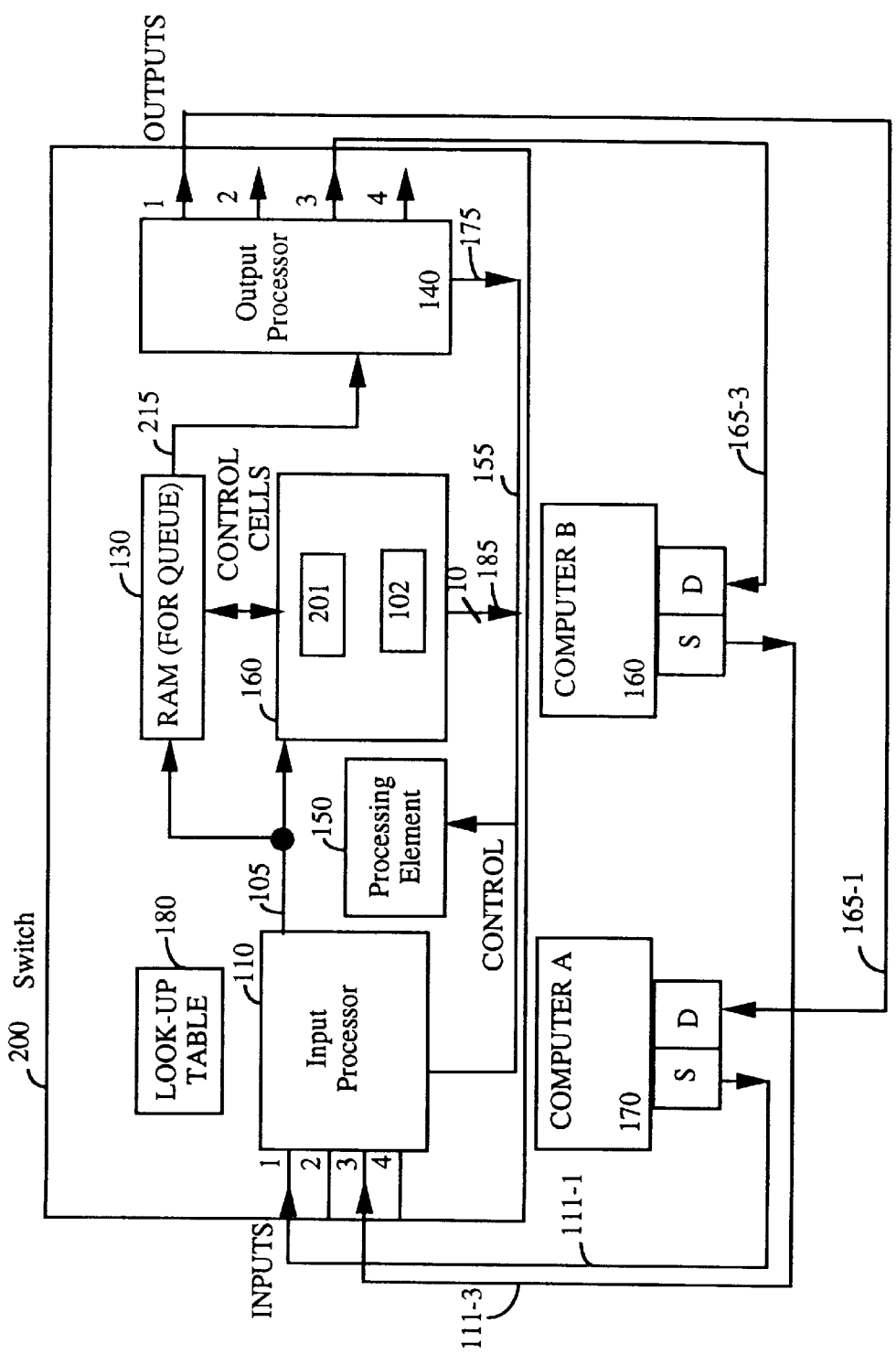
FIG. 4 shows a block diagram of the queue length measurement device of the present invention incorporated into a network using a switch.

Referring to FIG. 4, a system embodiment utilizing the present invention is illustrated, illustrating a combinational use of control cells and measurement value data feedback directly to the input processor and output processor. A computer system A (170) generates a source of cell flow 111-1 into input 1 of the input processor (110). The cells are stored in the queue memory (130) and the control cells can also be sent in parallel to the cell buffer controller 120/or are stripped out and sent to the cell buffer controller and then recombined into the output from the queue prior to output to the output processor. Additionally, the writing of the cells to the RAM (130) also generates a write signal to the differential measurement counter as discussed above. Additionally, computer B (161) provides a cell flow from its source via coupling 111-3 to input three of the input processor. This cell flow is also coupled to the RAM for queuing and redistribution. The cell buffer controller (160) operates in accordance as described above herein. It provides differential measurement values for each of the queues on a periodic basis as output on signal lines (185) for coupling to control bus (155) which couples to the input processor (110) and the output processor (140). The cell flow output from the queue memory (130) is read from the queue buffer responsive to a read signal, and the read signal is also utilized and coupled to the differential measurement counter as described above herein to generate a measurement value during each interval. The output processor selectively couples cells from the queue memory (130) via its outputs to respective indicated destinations. As illustrated, output 1 from the output processor (140) is coupled to computer A as its destination (170) via coupling 165-1, while output 3 from the output processor (140) is coupled via coupling 165-3 to computer B (161) as its destination. Coupling between the output processor, input processor and the computers can be via direct cabling, fiber optics, through a switch, or a router.

Since the output processor (140) is in closest connection with the sources (161 and 170), it can communicate via control cells to the respective sources, the respective queue conditions for which those sources are attempting to send cell flow. Thus, the output processor (140) can modify the control the cell coming from the queue memory (130) destined for a particular source computer, and communicate conditions of congestion to the source prior to the source's sending the cell flow. This is in addition to the communication of measurement value information to the input processor (110). Thus, multiple mechanisms are provided, providing both redundancy, and improved throughput Thus, the input and output processors (110 and 140), respectively, can utilize measurement value information in real time, as well as the output processor being capable of providing control cell modification and communicating information directly to the sources within a very short time.

In asynchronous transfer mode (ATM), communication is made in frames, and frames can vary from 3–4 cells up to 32 cells. There is also an indication somewhere of the last cell in the frame. It is important to drop all cells in a frame if any cells are dropped. Where inputs are coming from multiple sources, one computer source can be made to drop its cells for a period of time to permit flow of another source of cells, and then this can be done for other sources to permit that source to communicate. In this mode, there is no control cell.

What is communicated is that the cells for that frame must be dropped. Therefore, if it is seen that the queue is congested, then that queues contents are examined to see which cell is being queued, and if needed it, plus its related cells in the frame, is dropped. A look-up table (180) is provided which is used to indicate which cells are coming in from the same user. Thus, cells coming in from the same user are dropped until the last cell is found as indicated by the last cell indication in the frame.

Where there is a resource management cell or other control cell, it is possible to avoid dropping cells because the system can communicate to the source to slow down or stop, avoiding the loss or dropping of cells.

In variable bit rate service, usually used for video, traffic (cell flow) cannot be delayed too much because it will affect the quality of the output Since incoming cells are put in the queue, and there are a lot of users being sent simultaneously, and the speed of sending output is constant, there is a bursting affect where the queue is increasing and decreasing. The queue output measurement values are coupled to a list which gathers and maintains statistics on the usage of the queue and the available capacity of the queue both currently, and relative to past times. Thus, if for example there has been no selection of the queues for the last 24 hours, and at this time of day there was between 100–300 cells of traffic, then when a user requests to take one more call resulting in bursts of 50 cells at a time would be acceptable, even desirable, to use capacity. The processor, knowing the length of available space in the queue and its statistical makeup, knows that this type of operation will yield between 150 and 350 cells. If the queue has 350 cells, each going out at 3 micro-second intervals, there will be a 1 millisecond delay. If the system does not have the intelligence to use the measurement value, then the call would have to be dropped, or its quality grossly affected. With the present invention, in utilizing a processor to respond to the measurement value outputs, the system can switch the new call to a queue which is shorter (which has greater capacity, and thus shorten the delay to 150 microseconds). As illustrated herein, queue server (205) controls which queue outputs its cells via the cell buffer controller.

By having accumulation of the differential count of the moving of cells, a processor can also build a history providing variance of delay due to the queue. The maximum cell delay for each queue can be computed. Each source can provide information on what the maximum cell delay is that it can tolerate. The source can come from any one of a number of switches (e.g. 50 different switches from one place to another). If it's known that a maximum acceptable delay is 1 millisecond, and the statistics and history show that a queue is up to 750 microseconds of delay, a call will be rejected if adding its cells to the queue would exceed the maximum delay allowed.

The measurement value data is coupled to the input processor directly both for redundancy in ABR and VBR, and because with UBR type of traffic, there is no way to tell the source to slow down, so cells must be dropped to prevent contaminating or overwriting the queue. As discussed above with ABR, the control cells can be utilized to tell the sources to slow down, and by how much. The throttling of the input source can be used as a failsafe for dealing with contingencies such as a delay in communicating a control cell to the source which results in input to the input processor which would otherwise be written to the queue in overwrite and contaminated the queue's contents. However, the input processor, in conjunction with the present invention, can independently of a control cell have logic to determine that the queue its about to send to is full, and throttle its input without needing a control cell, and without discarding cells.

By making the queue measurement and use of the information independent from the rest of the switch, a processor can compute delays and queue capacities, and take a lot of calls based on the delay information which would otherwise be lost. The size of the queue, relative to the capacity of the differential queue counter should be at least 3 times the queue storage capacity, so that if the queue counter determines that its entire capacity is met during an interval by cell flow, the queue itself isn't already full. In the preferred embodiment, the queue is orders of magnitude larger than the queue counter, but other options are equally available dependent on design choices.

From the foregoing, it will be observed that numerous variations and modifications may be effected without departing ftom the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A congestion control system comprising:
   a queue having an input and an output, and capable of storing and outputting a plurality of data cells;
   an input processor for coupling a plurality of data cells to the queue input;
   an output processor, coupled to the queue output, for receiving a plurality of data cells from the queue;
   an interval measurement device for generating a pulse at predetermined intervals; and
   differential queue length generation logic, coupled to the queue and the interval measurement device, for generating a signal representative of change in size of the queue in response to determining for each of the predetermined intervals a change in size between a present queue length and a previous queue length.

2. The system as in claim 1, wherein said differential queue length generation logic has a predetermined maximum count and a predetermined minimum count.

3. The system as in claim 1, wherein said queue change in size signal is generated in two's complement form.

4. The system as in claim 1, wherein the differential queue length generation logic provides the change in size signal in a format providing increased and decreased size information.

5. The system as in claim 1, wherein the interval measurement device is dynamically programmable to time different intervals.

6. The system as in claim 1, wherein the interval measurement device is a timer that outputs the pulse after timing an interval equal to a predetermined number of data cells.

7. The system as in claim 1, wherein the differential queue length generation logic is further comprised of a differential counter, incremented for each queue output of a data cell and decremented for each queue input of a data cell, for providing a current change in queue size signal output.

8. The system as in claim 7, further comprising:
   a register for storing and outputting the change in queue size signal output of the differential counter, responsive to the pulse; and
   wherein the differential counter output is coupled to the register, and wherein the differential counter output is reset after its contents are stored in the register, responsive to the pulse.

9. The system as in claim 8, further comprising:

means for comparing the register output to the differential counter output to generate a comparator output;

a register for storing and outputting the change in queue size signal output of the differential counter, responsive to the pulse; and wherein the differential counter output is coupled to the register, and wherein the differential counter output is reset after its contents are stored in the register, responsive to the pulse.

10. The system as in claim 8, further comprising:

a processor coupled to the register for converting the current change in queue size signal output into a two's complement formatted output to provide the change in queue size signal output.

11. The system as in claim 1, further comprising:

means for processing a plurality of queue change in size signals over a plurality of successive time intervals to provide a queue congestion signal output.

12. The system as in claim 1, further comprising:

a host computer providing a source for outputting of the data cells, coupled to the input processor, and a destination associated with the source for receiving the data cells coupled from the output processor, and control means for selectively modifying the output of the data cells from the queue destined for coupling to the destination, responsive to the respective queue congestion signal wherein the source output of data cells is throttled responsive to the control means.

13. The system as in claim 12, wherein communication of data cells is in packets comprised of a control cell and a plurality of data cells, said control means further comprising:

means for selectively modifying the control cell for an output packet of data cells from the queue destined for coupling to the destination, responsive to the queue congestion signal to selectively throttle the source output of data cells responsive to the modified control cell.

14. The system as in claim 12, further characterized in that said host computer is comprised of a plurality of host computers each having its own respective associated source and destination, wherein the queue is comprised of a plurality of independent storage queues, each providing for input to and output of data cells from the input processor and to the output processor;

wherein the differential queue length generation logic is comprised of a plurality of queue length generation circuits, each associated with a respective one of the storage queues, each providing its own respective change in queue size output;

wherein the control means provides a separate one of the congestion outputs for each of the respective storage queue; and wherein the control means provides for detection of queue congestion for a specific one of the independent storage queues and provides for the interception of the output of a respective one of the control cells from one of the storage queues to be coupled to the same destination as the specific storage queue, wherein the control cell is modified by the control means to throttle the output from an associated source responsive to the congestion output for the specific one of the storage queues.

15. The system as in claim 12, further comprising:

means for purging a respective one of the storage queues of all data cells associated with a partial packet responsive to detecting the respective input has been throttled so as to compromise to the integrity of the respective packet, responsive to the queue congestion output.

16. The system as in claim 15, wherein said detecting is comprised of determining a timing throughput for full completion of the packet output exceeds a computed current throughput of said packet.

17. The system as in claim 16, wherein the computed current throughput is determined by the control cell for the respective packet.

18. The system as in claim 16, wherein the computed current throughput is determined by the identity of the source associated with the respective packet.

19. The system as in claim 16, wherein the computed current throughput is determined by the identity of the destination for the respective packet.

20. The system of claim 2 and further comprising:

means for dynamically changing the predetermined maximum and minimum counts.

21. The system of claim 11, wherein the time interval for the interval measurement device is programmable to a plurality of time intervals; and wherein the programmable time interval is determined responsive to the queue congestion output.

22. The system as in claim 1, wherein the cells are communicated from a first source having an associated first destination, in packets, comprised of a control cell and payload cells, wherein the control cell controls its receiving input processor, the system further coprising:

means for modifying the control cell output for a respective storage queue which is determined to be providing an output to the first destination, responsive to the congestion signal for the storage queue associated with the output to the first source; and wherein said modified control cell throttles the output from the first source prior to coupling to the input processor.

23. A method for controlling data flow in a computer network using a queue measurement device, the method comprising the steps of:

determining a measurement of available space of a queue using differential queue length logic based on a change in size of the queue for each of a present queue length and a previous queue length;

informing other computers in the computer network of the measurement of available space; and the other computers adjusting their data transfer rate in response to the measurement of available space.

24. A queue management system for measuring a data queue size, the system comprising:

memory for storing data;

a cell buffer controller, coupled to the memory, for partitioning the memory into a plurality of queues;

a first processor, coupled to the cell buffer controller, for controlling the data flow into the cell buffer controller;

a second processor, coupled to the cell buffer controller and to the first processor, for controlling the data flow out of the cell buffer controller; and differential queue measurement apparatus for measuring a change in length for each of the plurality of queues, responsive to the data flow into and out of the cell buffer controller.

25. The system of claim 24, wherein the cell buffer controller comprises:

control logic for controlling operation of the cell buffer control; and a plurality of registers for storing information regarding each queue's measurement of change in length.

26. The system of claim 25 and further including a multiplexer, coupled to the plurality of registers, for outputting one at a time each of a plurality of the registers.

27. A method for providing a queue size output, having a maximum size, the method comprising the steps of:

determining a current change in queue length in response to determining for each of a plurality of successive predefined time intervals a change in size of the queue between a present queue length and a previous queue length;

determining the current queue size responsive to accumulating the plurality of successive determinations of change in queue length; and outputting the current queue size.

* * * * *